United States Patent [19]

Szczyrbowski et al.

[11] Patent Number: 5,170,291

[45] Date of Patent: Dec. 8, 1992

[54] COATING, COMPOSED OF AN OPTICALLY EFFECTIVE LAYER SYSTEM, FOR SUBSTRATES, WHEREBY THE LAYER SYSTEM HAS A HIGH ANTI-REFLECTIVE EFFECT, AND METHOD FOR MANUFACTURING THE COATING

[75] Inventors: Joachim Szczyrbowski, Goldbach; Klaus Hartig, Ronneburg; Wolfgang Lohwasser, Wettenberg, all of Fed. Rep. of Germany

[73] Assignee: Leybold Aktiengesellschaft, Fed. Rep. of Germany

[21] Appl. No.: 717,027

[22] Filed: Jun. 18, 1991

Related U.S. Application Data

[63] Continuation-in-part of Ser. No. 561,735, Aug. 1, 1990, abandoned.

[30] Foreign Application Priority Data

Dec. 19, 1989 [DE] Fed. Rep. of Germany ....... 3941796
May 27, 1991 [DE] Fed. Rep. of Germany ....... 4117256

[51] Int. Cl.$^5$ ............................. G02B 1/10; B05D 5/06
[52] U.S. Cl. ................................... 359/580; 359/586; 359/588; 427/166
[58] Field of Search ............... 359/580, 582, 586, 588; 427/164, 166

[56] References Cited

U.S. PATENT DOCUMENTS

| | | |
|---|---|---|
| 3,432,225 | 3/1969 | Rock . |
| 3,695,910 | 10/1972 | Louderback et al. . |
| 3,761,160 | 9/1973 | Apfel et al. . |
| 3,781,090 | 12/1973 | Sumita . |
| 3,829,197 | 8/1974 | Thelen . |
| 3,854,796 | 12/1974 | Thelen . |
| 4,322,276 | 3/1982 | Meckel et al. . |
| 4,387,960 | 6/1983 | Tani . |
| 4,507,547 | 3/1985 | Taga et al. . |
| 4,732,454 | 3/1988 | Saito et al. . |
| 4,778,731 | 10/1988 | Kraatz et al. . |
| 4,804,883 | 2/1989 | Müller et al. . |

FOREIGN PATENT DOCUMENTS

| | | |
|---|---|---|
| 300401 | 7/1972 | Austria . |
| 0349192A2 | 1/1990 | European Pat. Off. . |
| 736411 | 6/1943 | Fed. Rep. of Germany . |
| 742463 | 1/1944 | Fed. Rep. of Germany . |
| 1596816 | 4/1971 | Fed. Rep. of Germany . |
| 2448499 | 5/1975 | Fed. Rep. of Germany . |
| 2457474 | 6/1976 | Fed. Rep. of Germany . |
| 2720742 | 12/1977 | Fed. Rep. of Germany . |
| 2829279 | 1/1980 | Fed. Rep. of Germany . |
| 3125267 | 1/1983 | Fed. Rep. of Germany . |
| 2902848-C2 | 2/1983 | Fed. Rep. of Germany . |
| 2256435-C3 | 3/1984 | Fed. Rep. of Germany . |
| 3302827 | 8/1984 | Fed. Rep. of Germany . |
| 2646513-C2 | 10/1984 | Fed. Rep. of Germany . |
| 3404736 | 10/1984 | Fed. Rep. of Germany . |
| 2738044-C2 | 11/1984 | Fed. Rep. of Germany . |
| 3627248 | 4/1987 | Fed. Rep. of Germany . |
| 3636676 | 5/1987 | Fed. Rep. of Germany . |
| 3629996 | 3/1988 | Fed. Rep. of Germany . |
| 3430727-C2 | 7/1989 | Fed. Rep. of Germany . |
| 4024308 | 2/1991 | Fed. Rep. of Germany . |
| 233344 | 9/1942 | Switzerland . |
| 1083144 | 3/1984 | U.S.S.R. . |

OTHER PUBLICATIONS

Buehler et al, "All-oxide broadband antireflection coatings by reactive ion plating depostion:," *Applied Optics*, Aug. 15, 1988, vol. 27, No. 16, pp. 3359–3361.

*Primary Examiner*—Martin Lerner
*Attorney, Agent, or Firm*—Hill, Van Santen, Steadman & Simpson

[57] ABSTRACT

A coating for applying to a front side of a substrate, which side is facing an observer, comprises a four-layer system which is optically effective and has a high anti-reflective effect. A first layer of this system is applied onto the front side of the substrate and is, preferably, a highly-refracting $TiO_2$ layer, the second layer is applied to the first layer and is a low-refracting $Al_2O_3$ layer, a third layer of the system is applied to the second layer and is, preferably, a high-refracting $TiO_2$, while the fourth layer applied to the third layer is, preferably, a low-refracting $SiO_2$ layer. The layers can be formed by either a pyrolytic method, a plasma-supported chemical vapor deposition method, a sputtering method or a chemical vapor deposition method. Preferably, they are formed by a DC-reactive sputtering method with a magnetron.

20 Claims, 1 Drawing Sheet

Wavelength (nm)
Reflexion

COATING, COMPOSED OF AN OPTICALLY EFFECTIVE LAYER SYSTEM, FOR SUBSTRATES, WHEREBY THE LAYER SYSTEM HAS A HIGH ANTI-REFLECTIVE EFFECT, AND METHOD FOR MANUFACTURING THE COATING

CROSS-REFERENCE TO RELATED APPLICATIONS

The present invention is a continuation-in-part of our copending U.S. patent application Ser. No. 07/561,735, filed Aug. 1, 1990, and now abandoned.

BACKGROUND OF THE INVENTION

The present invention is directed to a coating composed of an optically effective layer system, for substrates, whereby the layer system has a high anti-reflective effect. The invention is also directed to a method of manufacturing the layer system.

There is a wide range of layer systems for substrates, particularly for glass, which fulfill certain optical functions.

German OS 36 29 996 discloses an adaptor unit/aggregate for cathode ray tubes of monitors, television sets and such, which unit is composed of a glass disk, particularly a gray glass disk, with a front side anti-reflection equipment and a backside absorption coating. The absorption coating comprises metal atoms. In this German publication it is suggested that the absorption coating is structured in a one-layered fashion from chromium, a chromium/nickel - alloy or silicides, and established and grounded antistatically, as well as provided with a thickness which lowers the light transmission compared to the uncoated glass disk by approximately one third.

U.S. Pat. No. 3,854,796, whose disclosure is incorporated herein by reference thereto, discloses a coating for the reduction of reflection. The coating is to be applied on a substrate and has a plurality of layers. In the sequence beginning at the substrate, the U.S. patent describes the following arrangement: three groups of at least two lambda/4-layers, the successive layers of the first group have a refractive index lying below the refractive index of the substrate. The layers of the second group have an increasing refractive index and the layers of the third group have a refractive index decreasing below that of the substrate.

U.S. Pat. No. 3,761,160, whose disclosure is incorporated herein by reference thereto, discloses a broad-band-anti-reflection-coating and substrates which are coated with such a coating. The coatings have at least four layers for glass with a high index of refraction and at least six layers for glass with a low index of refraction.

U.S. Pat. No. 3,695,910, whose disclosure is incorporated herein by reference thereto, describes a method for the application of a anti-reflective coating on a substrate. This coating is composed of several individual layers. The method for the application of the anti-reflection coatings occurs under vacuum, namely with the use of electron beams.

U.S. Pat. No. 3,829,197, whose disclosure is incorporated herein by reference thereto, describes a anti-reflection coating fashioned as a multi-layer system. This coating is to be applied on a highly refractive substrate. The layer system is composed of five individual layers which are mutually adapted namely regarding their refractive index and regarding their optical thickness. This adaptation is to achieve a favorable anti-reflection curve with a broad, flat, center part.

Swiss Patent No. 223344 also belongs to prior art. This patent deals with a coating for the reduction of surface reflection. The coating is composed of at least three layers with various refraction coefficients. The reduction of the surface reflection shall be achieved according to this reference by a certain selection of refraction coefficients of the individual layers.

SUMMARY OF THE INVENTION

An object of the invention is to create conditions for the manufacturing of anti-reflection layers on transparent substrates particularly on such substrates having a refractive index of n=ca. 1.5 to 1.6. At the same time, the light transmission is to be high and the total thickness of the coating is to be optimally thin so that the manufacturing costs can be reduced correspondingly.

With the invention, a concept is to be suggested whereby sputtering from the metal target can be performed on a large scale in a DC-reactive fashion with a magnetron.

The low number of layers of the layer system, the thinness of the individual layers of the layer system, the selection of inexpensive material and the possibility to sputter from the metal target in a DC-reactive fashion with a magnetron allows a completely economical manufacturing of the inventive anti-reflective systems.

One part of the complex tasks, which the invention is based upon, is the specific goal to make it possible that the first and the second layer can vary greatly in their thicknesses without the good anti-reflection effect of the entire system composed of four layers changing significantly.

This desired non-sensitivity of the two first relatively thin layers with regards to the good anti-reflection effect of the entire system brings a series of advantages:

If the application of the layer thicknesses of the first two layers does not require ultimate accuracy, or respectively, if one can afford certain tolerance freedom during the application of the first and second layer, the entire manufacturing procedure becomes correspondingly simpler and cheaper.

Overall, the whole package of the layers is relatively thin. It ranges approximately 30% below comparable layer systems of the prior art. The thinness of the whole package alone reduces manufacturing costs.

According to the invention, the stated objects are solved in that, on a front side of a substrate, which side faces the observer, a layer system is placed and has a local sequence from the front side to the observer of a first layer being arranged directly on the substrate and comprising highly refracting material, preferably $TiO_2$; subsequently a second layer being arranged on the first layer and comprising a low-refracting material, preferably $Al_2O_3$; subsequently a third layer being arranged on the second layer and comprising high-refracting material preferably $TiO_2$; and, finally, a fourth layer being arranged in the third layer and comprising a low-refracting material, preferably $SiO_2$.

Thereby, it can be provided that either or both the first layer and the third layer comprises compounds selected from a group consisting of $TiO_2$, $ZnS$, $Bi_2O_3$ and mixtures of the compounds $TiO_2$, $AnS$, and $Bi_2O_3$.

It is suggested that the second layer comprises oxides selected from a group consisting of $Al_2O_3$, $MgO$, $SiO_2$, SiAl-oxide, NiSi-oxide, and mixtures of these oxides.

Finally, the fourth layer can comprise compounds selected from a group consisting of: $SiO_2$, $MgF_2$ and mixtures of $SiO_2$, and $MgF_2$.

Regarding the refraction coefficients or index of refraction, a further embodiment of the invention suggests that the first layer is composed of material with a refraction coefficient of n greater than or equal to 2.2, and preferably n=2.4, that the second layer is composed of a material with a refraction coefficient of n=ca. 1.6, that the third layer is composed of material with a refraction coefficient n greater than or equal to 2.2, and preferably n=2.4; and that the fourth layer is composed of material with a refraction coefficient n less than or equal to 1.5, and preferably n=1.48.

Regarding the layer thicknesses it is suggested that the first layer has a thickness of 100 angstrom ±10%; that the second layer has a thickness of 400 angstrom ±5%; that the third layer has a thickness of 1040 angstrom ±2%; and that the fourth layer has a thickness of 940 angstrom ±2%. These values for the respective layer thicknesses are selected within the cited layer thickness tolerances that take into consideration the interdependencies between the individual layer thicknesses and the materials being used in the layers.

In a preferred embodiment, the layer system is placed on the first side of the substrate, which side faces the observer, and the system in local sequence from the front side to the observer has a first layer being arranged directly on the substrate and comprising a highly refracting material, preferably $TiO_2$, with a thickness of 100 angstrom ±10%; a second layer being arranged on the first layer and comprising a low-refracting material preferably $Al_2O_3$, with a thickness of 400 angstrom ±5%; a third layer being arranged on the second layer and comprising a high-refracting material, preferably $TiO_2$, with a thickness of 1040 angstrom ±2%, and a fourth layer being arranged on the third layer and comprising a low-refracting material, preferably $SiO_2$, with a thickness of 940 angstrom ±2%.

Preferably, each of the layers has an optical density which is the actual physical thickness times the index of refraction. When using light in the visible range having a wavelength $\lambda=555$ nm, the optical density of the first layer will be equal to $n_1 \times d_1$, which is equal to or approximately equal to $0.05\lambda$, wherein the refractive index $n_1$ is between 1.8 and 2.56. The optical density of the second layer is $n_2 \times d_2$, which is equal to or approximately equal to $0.12\lambda$, given a refractive index $n_2$ between 1.55 and 1.75. The optical density of the third layer will be $n_3 \times d_3$, which is equal to or approximately equal to $0.5\lambda$, given a refractive index $n_3$ between 1.80 and 2.58. The optical density of the fourth layer is $n_4 \times d_4$, which is equal to or approximately equal to $0.25\lambda$, given a refractive index $n_4$ between 1.30 and 1.63. It should be noted that in the above, the first and third layers are preferably of a $TiO_2$, while the second layer is preferably $Al_2O_3$ and the fourth layer is preferably $SiO_2$.

The stated objects are achieved by the invention, in particular the manufacture costs are considerably reduced, a smooth course of the refractive spectrum is achieved in the visible range. It has become possible in this way to produce an extremely neutral anti-reflection filter.

Of particular advantage for cost-reducing manufacturing is the suggestion according to which a cathode sputtering method particularly a DC-reactive sputtering from the target with a magnetron is employed for the coating.

Thereby, it can be provided for the first and third layer that via DC-reactive sputtering from the Ti-target with a magnetron a layer composed of $TiO_2$ is generated in the presence of a sputter gas mixture comprising Ar and $O_2$, namely given a pressure of approximately $5 \times 10^{-3}$ mbar.

For the second layer it is proposed that via DC-reactive sputtering from the Al-target with a magnetron a layer composed of $Al_2O_3$ is generated in the presence of a sputter gas mixture comprising Ar and $O_2$, namely given a pressure of approximately $8 \times 10^{-3}$ mbar.

For the fourth layer it is proposed that via DC-reactive sputtering from the Si-target with a magnetron a layer composed of $SiO_2$ is generated in the presence of a sputter gas mixture comprising Ar and $O_2$, namely given a pressure of approximately $1.2 \times 10^{-2}$ mbar.

Actually other known methods can also be employed for the coating, such as, an actually known vacuum metallization (evaporation), an actually known Chemical Vapor Deposition method (CVD), an actually known plasma supported Chemical Vapor Deposition method (CVD), and an actually known pyrolytic-method.

The following advantages are achieved with the invention:

The initially described problems are solved. Specifically mentioned must be the fact that it became possible due to the invention that the first and second layer can greatly vary in their thicknesses without any significant alteration of the good anti-reflection effect of the entire system of four layers.

Overall, the whole package of layers is relatively thin. It ranges ca. 30% below comparable layer systems of the prior art. The thinness of the whole package alone reduces manufacturing costs.

Other features, advantages and objects of the invention will be readily apparent from the following description of the preferred embodiments, the claims and the drawings.

DESCRIPTION OF THE PREFERRED EMBODIMENTS

Figure 1:
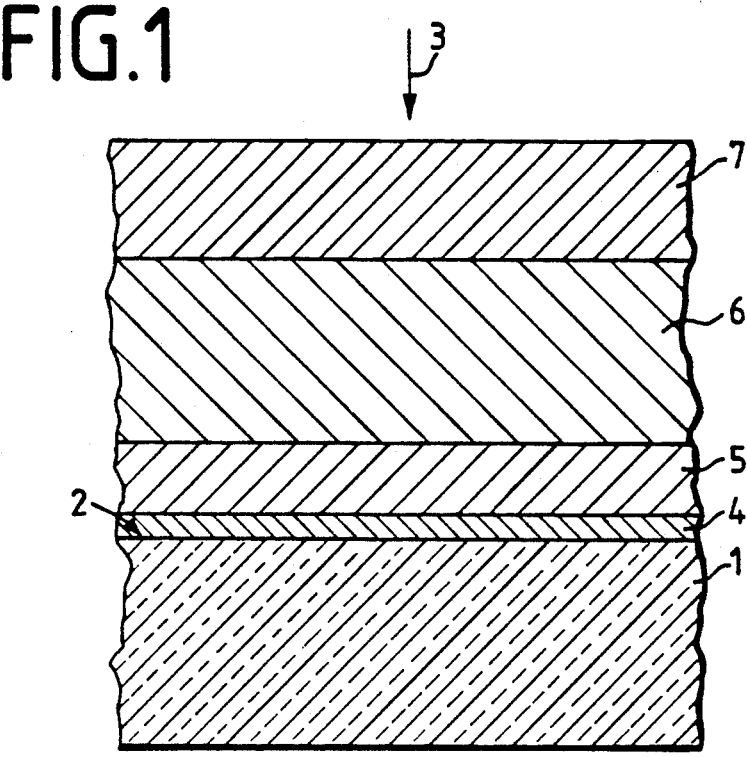
FIG. 1 is a cross sectional view of a layer system according to the present invention.

A substrate 1 can be composed of glass, of a plastic foil or another see-through material. A front side 2 of the substrate 1 is that side of the substrate facing the observer, whose direction of viewing is indicated by arrow 3. A layer 4, which is contacting the front side 2 of the substrate 1, is called a "first" layer 4. In the direction to the observer follows the "second" layer 5, the "third" layer 6, and the "fourth" layer 7. The layers 4, 5, 6 and 7 form a layer system of the present invention.

Following is the description of the layer system whereby the reflection was measured in the range of wavelength for visible light at the surface of a polyester foil facing the observer. The measurement results are graphically illustrated in FIG. 2 with curve 8.

The layer system is placed on a substrate which is a polyester foil with a thickness of 32 micrometer, and a refractive index or coefficient n=1.6. The "first" layer 4 of the system is a $TiO_2$ layer of a thickness of 100 angstrom and a refractive index or coefficient n=2.4. The "second" layer 5 is an Al$_2$O$_3$ layer of a thickness of 400 angstrom, and a refraction index or coefficient n=1.6. The "third" layer 6 is a TiO$_2$ layer with a thickness of 1040 angstrom, and a refractive index or coefficient n=2.4. The "fourth" layer 7 is a SiO$_2$ layer with a thickness of 940 angstrom, and a refraction coefficient or index n=1.48.

For this layer system, the reflection was measured in per cent at the surface of the polyester foil, namely for a wavelength range from 360 nm to 730 nm. Subsequently, the measured results of the reflection are compared to certain wavelengths in a table:

| wavelength (nm) | reflection (%) |
|---|---|
| 730 | 0.82 |
| 690 | 0.22 |
| 650 | 0.2 |
| 620 | 0.152 |
| 590 | 0.18 |
| 560 | 0.24 |
| 540 | 0.252 |
| 520 | 0.244 |
| 500 | 0.208 |
| 480 | 0.168 |
| 460 | 0.168 |
| 440 | 0.42 |
| 430 | 0.74 |
| 410 | 1.92 |
| 400 | 2.96 |
| 390 | 4.36 |
| 380 | 4.56 |
| 360 | 4.56 |

Figure 2:
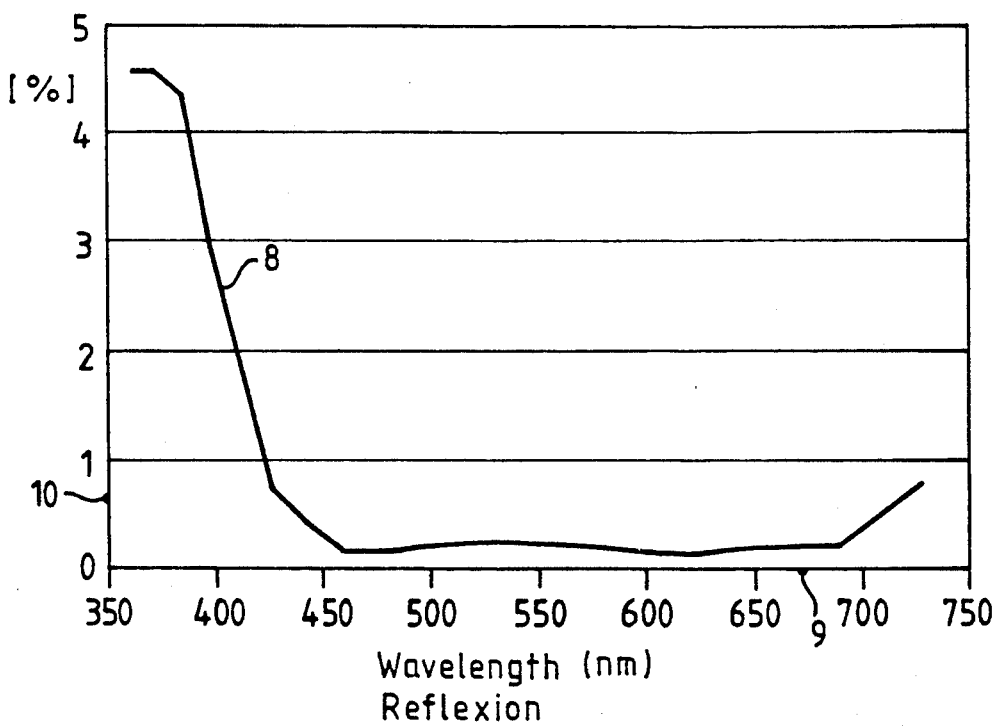
FIG. 2 is a graph showing a reflection curve in per cent versus wavelengths in nm.

The results are shown graphically in FIG. 2. On the abscissa 9 of the system of coordinates in FIG. 2 the wavelengths are entered in nm. On the ordinate 10 of the coordinate system the per cent values for the reflection are entered.

The curve reveals clearly that the reflection in the core wavelength region of the visible light particularly between 450 and nm is extraordinarily low. It lies far under 1%. Thus, the desired high anti-reflective effect has been achieved in a surprisingly clear fashion.

The layer system with which the above cited reflection values were reached has been manufactured according to the following method:

The sputtering was performed with a magnetron namely in a reactive gas atmosphere composed of a gas mixture of Ar and O$_2$. The target materials were Ti, Al, and Si. The pressure during the sputtering was as follows:

sputtering from the Ti-target: $5 \times 10^{-3}$ mbar;
sputtering from the Al-target $8 \times 10^{-3}$ mbar; and
sputtering from the Si-target: $1.2 \times 10^{-2}$ mbar.

The sputtering was performed in a stoichiometric (full-oxidic) fashion.

Although various minor modifications may be suggested by those versed in the art, it should be understood that we wish to embody within the scope of the patent granted hereon all such modifications as reasonably and properly come within the scope of our contribution to the art.

We claim:

1. A coating for a front side of a substrate, which side faces an observer, said coating being composed of an optically effective layer system, said layer system having a high anti-reflective effect, said layer system being composed of four layers with a first layer with a layer thickness of 100Å±10% being arranged on the front side of the substrate and comprising a highly refractive material, a second layer of the four layers being arranged on the first layer, said second layer having a thickness of 400Å±5% and comprising a low-refracting material, a third layer of the four layers being arranged on the second layer, said third layer having a thickness of 1040Å±2% and comprising a highly refractive material, and the fourth layer of the four layers being arranged on the third layer, said fourth layer having a thickness of 940Å±2% and comprising a low-refracting material.

2. A coating according to claim 1, wherein the first and third layers are of TiO$_2$, said second layer is Al$_2$O$_3$ and said fourth layer is SiO$_2$.

3. A coating according to claim 1, wherein the first layer comprises a compound selected from a group consisting of TiO$_2$, ZnS, Bi$_2$O$_3$, and mixtures of TiO$_2$, ZnS, Bi$_2$O$_3$.

4. A coating according to claim 1, wherein the second layer comprises oxides selected from a group consisting of Al$_2$O$_3$, MgO, SiO$_2$, SiAl-oxide, NiSi-oxide and mixtures of these oxides.

5. A coating according to claim 1, wherein the third layer comprises a compound selected from a group consisting of TiO$_2$, ZnS, Bi$_2$O$_3$ and mixtures of these compounds.

6. A coating according to claim 1, wherein the fourth layer comprises a compound selected from a group consisting of SiO$_2$ and MgF$_2$ and mixtures of SiO$_2$ and MgF$_2$.

7. A coating according to claim 1, wherein the first layer is composed of a material with a refractive coefficient n≧2.2; the second layer is composed of a material with a refractive index n=approximately 1.6; the third layer is composed of a material with a refractive index n≧2.2; and the fourth layer is composed of a material with a refractive index of n≦1.5.

8. A coating according to claim 7, wherein the index of refraction for the first and third coatings is n=2.4 and the index of refraction for the fourth coating is n=1.48.

9. A coating for a front surface of a substrate when viewed by an observer, said coating being composed of an optically effective layer system, said layer system having a high anti-reflective effect and being composed of four layers, a first layer of the four layers being arranged next to the front surface of the substrate and being highly refracting, said first layer being a TiO$_2$ layer with a thickness of 100 angstrom ±10%, a second layer of the four layers being arranged on the first layer and being a low-refracting material, said second layer being an Al$_2$O$_3$ layer with a thickness of 400 angstrom ±5%, a third layer of the four layers being arranged on said second layer and comprising a highly refractive material, said third layer being a TiO$_2$ layer with a layer thickness of 1040 angstrom ±2%, a fourth layer of the four layers being arranged on the third layer and being a low-refracting material, said fourth layer being an SiO$_2$ layer with a layer thickness of 940 angstrom ±2%.

10. A coating for a front surface of a substrate, which surface faces an observer, said coating being composed of an optically effective layer system, said layer system having a high anti-reflective effect for a visible range of light having a wavelength λ, said layer system being composed of four layers with each layer having an optical density being defined by the refractive index (n) times an actual layer thickness (d), a first layer of the four layers being arranged on the front side of the substrate and comprising a highly refractive material with $n_1$ being between 1.8 and 2.56 and the optical density of $n_1 \times d_1$ being approximately equal to $0.05\lambda$, a second layer of the four layers being arranged on the first layer and comprising a low-refracting material with $n_2$ being between 1.55 and 1.75 and the optical density $n_2 \times d_2$ being approximately equal to $0.12\lambda$, a third layer of the four layers being arranged on the second layer and comprising a highly reflective material with $n_3$ being between 1.8 and 2.58 and the optical density $n_3 \times d_3$ being approximately equal to $0.5\lambda$, and a fourth layer of the four layers being arranged on the third layer and comprising a low-refracting material with $n_4$ being between 1.3 and 1.63 and the optical density $n_4 \times d_4$ being approximately equal to $0.25\lambda$.

11. A coating according to claim 10, wherein $\lambda$ is approximately 555 nm.

12. A coating according to claim 11, wherein the first and layers are $TiO_2$, the second layer is $Al_2O_3$ and the fourth layer is $SiO_2$.

13. A method for manufacturing a coating comprising a layer system of four layers on a substrate, said system having a first layer with a thickness of 100 angstrom $\pm 10\%$, a second layer with a thickness of 400 angstrom $\pm 5\%$, a third layer with a thickness of 1040 angstrom $\pm 2\%$, a fourth layer with a thickness of 940 angstrom $\pm 2\%$, and the values of the respective layer thickness being selected within a cited layer thickness tolerance that takes into consideration the interdependencies between the individual layer thicknesses and the material being used for each layer, said method comprising providing the substrate and forming the four-layer system directly on said substrate by applying the first layer on the substrate followed by the second, third and fourth layers by a method selected from a group consisting of a vacuum-metallization method, a chemical vapor deposition method, a plasma-supported chemical deposition method, a pyrolytic method, and a DC-reactive sputtering method from a target with a magnetron.

14. A method according to claim 13, wherein the method used for applying the layers is a DC-reactive sputtering from a target with a magnetron.

15. A method according to claim 13, wherein one of the first and third layers of the four layer system is a layer composed of $TiO_2$, and the method includes DC-reactive sputtering from a Ti-target with a magnetron while providing sputtering gas mixtures comprising Ar and $O_2$ at a pressure of approximately $5 \times 10^{-3}$ mbar.

16. A method according to claim 13, wherein a second layer of the four-layer system is an $Al_2O_3$ layer and said method includes DC-reactive sputtering with a sputtering gas mixture from an aluminum target with a magnetron, said sputtering gas mixture comprising Ar and $O_2$ at a pressure of approximately $8 \times 10^{-3}$ mbar.

17. A method according to claim 13, wherein the fourth and outermost layer of the four-layer system is a layer composed of $SiO_2$ and said method includes DC-reactive sputtering from a silicon target with a magnetron in a sputtering gas mixture, said sputtering gas mixture comprising Ar and $O_2$ at a pressure of approximately $1.2 \times 10^{-2}$ mbar.

18. A method according to claim 13, wherein the method of applying the layers is a vacuum-metallization method.

19. A method for manufacturing a coating comprising a layer system of four layers on a substrate, said method comprising providing the substrate, forming the four-layer system directly on said substrate by applying the first layer on the substrate followed by the second, third and fourth layers by a method selected from a group consisting of a vacuum-metallization method, a chemical vapor deposition method, a plasma-supported chemical deposition method, a pyrolytic method, and a DC-reactive sputtering method from a target with a magnetron, and selecting the refractive index n and the thickness d of each layer to provide a desired optical density, $n \times d$, with the materials of the first layer having $n_1$ being between 1.8 and 2.56 and $n_1 \times d_1$ being approximately equal to $0.05\lambda$ for visible light, the second layer having $n_2$ being in a range of 1.55 to 1.75 and $n_2 \times d_2$ being approximately equal to $0.12\lambda$, the third layer having $n_3$ being in a range of 1.8 to 2.56 and $n_3 \times d_3$ being approximately equal to $0.5\lambda$ and the fourth layer having $n_4$ in a range of 1.3 to 1.63 and $n_4 \times d_4$ being approximately equal to $0.25\lambda$.

20. A method according to claim 19, wherein the first and third layers are composed of $TiO_2$, the second layer is composed of $Al_2O_2$, and the fourth layer is composed of $SiO_2$.

* * * * *